United States Patent
Suzuki (10) Patent No.: US 8,983,730 B2
(45) Date of Patent: Mar. 17, 2015

(54) ELECTRIC POWER STEERING APPARATUS

(75) Inventor: Hiroshi Suzuki, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/876,597

(22) PCT Filed: Sep. 28, 2011

(86) PCT No.: PCT/IB2011/002261
§ 371 (c)(1),
(2), (4) Date: Apr. 26, 2013

(87) PCT Pub. No.: WO2012/042351
PCT Pub. Date: Apr. 5, 2012

(65) Prior Publication Data
US 2013/0218417 A1    Aug. 22, 2013

(30) Foreign Application Priority Data
Sep. 29, 2010   (JP) .................. 2010-219392

(51) Int. Cl.
*B62D 5/04*        (2006.01)
*H02P 29/02*       (2006.01)
*H02P 21/00*       (2006.01)

(52) U.S. Cl.
CPC ............ *B62D 5/0472* (2013.01); *B62D 5/0403* (2013.01); *H02P 29/025* (2013.01); *H02P 21/0003* (2013.01)
USPC .................. 701/42; 701/41; 701/43; 318/432; 318/609

(58) Field of Classification Search
CPC ...... B62D 5/046; B62D 5/049; B62D 5/0403; B62D 5/0472; B62D 5/0484; B62D 5/0487; B62D 15/0245
See application file for complete search history.

(56) References Cited

U.S. PATENT DOCUMENTS

| 5,242,325 | A  | * | 9/1993  | Nukushina ................ 454/285 |
| 5,670,854 | A  | * | 9/1997  | Matsuura et al. ............ 318/432 |
| 6,911,795 | B2 | * | 6/2005  | Matsuoka et al. ............ 318/437 |
| 7,187,153 | B2 | * | 3/2007  | Imagawa et al. ............ 318/638 |
| 7,290,638 | B2 | * | 11/2007 | Shiino et al. ................ 180/444 |
| 8,564,232 | B2 | * | 10/2013 | Sato ........................ 318/400.21 |
| 2003/0193308 | A1 | * | 10/2003 | Richardson et al. .......... 318/700 |
| 2004/0113575 | A1 |   | 6/2004  | Matsuoka et al. |
| 2005/0159866 | A1 | * | 7/2005  | Takeuchi et al. ............. 701/41 |
| 2005/0257992 | A1 |   | 11/2005 | Shiino et al. |
| 2007/0132414 | A1 | * | 6/2007  | Arai et al. .................... 318/432 |
| 2011/0098887 | A1 | * | 4/2011  | Fujimoto ..................... 701/41 |

FOREIGN PATENT DOCUMENTS

| JP | A-2005-247214 |   | 9/2005 |
| JP | WO2010084623  | * | 7/2010 |

OTHER PUBLICATIONS

International Search Report issued in International Patent Application No. PCT/IB2011/002261 dated Feb. 21, 2012.

* cited by examiner

*Primary Examiner* — John R Olszewski
*Assistant Examiner* — Nicholas K Wiltey
(74) *Attorney, Agent, or Firm* — Oliff PLC (57) ABSTRACT

An electric motor has a stator and a rotor that are used in common between two systems. An ECU controls the motor torque by supplying drive electric power to the motor coils independently of each other. When the ECU determines that the vehicle is traveling on a uneven road, the ECU causes the electric motor to perform a braking operation by short-circuiting at least two phases of the electric motor of one of the two systems that is other than the system that is executing a torque control of controlling the assist torque according to the steering torque and the vehicle speed.

5 Claims, 5 Drawing Sheets

FIG. 4

ELECTRIC POWER STEERING APPARATUS

BACKGROUND OF THE INVENTION

1. Field of the Invention

The invention relates to an electric power steering apparatus.

2. Description of Related Art

An electric power steering apparatus (EPS) gives an assist force to a steering system by rotating a steering shaft through the use of an electric motor as a drive source. This kind of EPS in a vehicle changes its assist characteristic according to the state of travel of the vehicle by controlling a single electric motor. However, the control performed via the single motor has a limit in the setting of an assist characteristic that finely adapts to various road conditions from a flat asphalt road (flat road) to a bad or rough road such as a Belgian road or the like. Therefore, in order to further improve the degree of freedom in the assist characteristic setting, an EPS is provided with two drive sources in a steering system that extends from the steering wheel to steered wheels (e.g., Japanese Patent Application Publication No. 2005-247214 (JP-A-2005-247214)). The EPS shown in Japanese Patent Application Publication No. 2005-247214 (JP-A-2005-247214) uses, as the two drive sources, for example, a column assist type EPS (column EPS) and a pinion assist type EPS (pinion EPS), and controls the motors of the column EPS and of the pinion EPS according to the state of travel of the vehicle, so as to improve the degree of freedom in the assist characteristic setting.

However, the EPS described in Japanese Patent Application Publication No. 2005-247214 (JP-A-2005-247214) has a structure in which the column EPS and the pinion EPS are interlinked via an intermediate shaft and a joint. Therefore, when the vehicle travels on a uneven road, force that is reversely input from the road surface to the steered wheels acts on the intermediate shaft and the joint, causing a twist between the column EPS and the pinion EPS, and the vibration or rotation caused by the twist is transmitted to the steering wheel via the column EPS. Incidentally, the reverse input of force from the steered wheels is restrained by a reaction that is caused by the mechanical friction of the pinion EPS and the inertia of the electric motor. However, since the steered wheels are linked to the column EPS as well via the intermediate shaft and the joint, a large force that is reversely input, in particular, is inevitably transmitted to the steering wheel. As a result, loss of control of the steering wheel or vibration thereof occurs, so that the straight-ahead directional stability of the vehicle is lost.

SUMMARY OF THE INVENTION

The invention provides an electric power steering apparatus that improves the straight-ahead directional stability of the vehicle both during the traveling on flat roads and during the traveling on uneven roads.

A first aspect of the invention relates to an electric power steering apparatus that includes: a steering force assist device that gives assist force based on magnetomotive force generated by motor coils of two systems provided independently of each other; and control means for controlling operation of the steering force assist device through electric power supply to the motor coils. The control means includes command means for generating an electric current command value for the electric power supply so as to generate a motor torque that corresponds to the assist force, control signal output means for outputting control signals for the two systems independent of each other, based on the electric current command value, and drive circuits of the two systems independent of each other that output three-phase drive electric power to the motor coils that respectively correspond to the drive circuits based on the control signals. When a predetermined condition is satisfied, the control signal output means outputs the control signals to the drive circuits by causing short-circuit at least between two phases of three phases of the motor coils.

According to the foregoing aspect, in the case where it is determined that the vehicle is traveling on a uneven road (when the predetermined condition is satisfied), short-circuit is made between at least two of the three phases of the motor of one of the two systems so as to bring about a braking operation (dynamic braking). As a result, the external disturbance energy that is input due to the traveling on the uneven road can be consumed as heat generation by the internal resistance of the electric motor, so that wobble of the steering wheel (loss of control of the steering wheel) and vibration thereof are restrained. Therefore, the straight-ahead directional stability can be maintained and the steering feeling can be improved.

In the foregoing aspect, the predetermined condition may be satisfied when reverse input of force from a steered wheel to the steering force assist device is greater than or equal to a predetermined value.

In the foregoing aspect, the predetermined condition may be satisfied depending on a road surface state that is determined based on speed of a vehicle in which the electric power steering apparatus is mounted and vertical acceleration of the vehicle.

In the foregoing aspect, when the predetermined condition is satisfied, the control signal output means may output the control signals to the drive circuits by causing short-circuit between at least two phases of the three phases of the motor coils of at least one of the two systems that is not executing the assist operation.

According to the foregoing construction, when it is determined that the vehicle is traveling on a uneven road, one of the two systems is caused to execute a known torque control of controlling the assist torque according to the steering torque and the vehicle speed, while in the other system, which does not perform the assist operation, at least two phases of the motor coils are short-circuited so as to bring about a braking operation. As a result, the straight-ahead directional stability of the vehicle and the steering feeling can be improved.

In the foregoing aspect, when the predetermined condition is satisfied, the control signal output means may output the control signals for continued execution of an assist control to the motor coils of at least one of the two systems that is executing the assist operation.

In the foregoing aspect, wherein the motor coils of the two systems may have a stator and a rotor which are used in common between the two systems.

According to the above-described aspect of the invention, it is possible to provide an electric power steering apparatus that improves the straight-ahead directional stability of the vehicle both during the traveling on flat roads and during the traveling on uneven roads.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
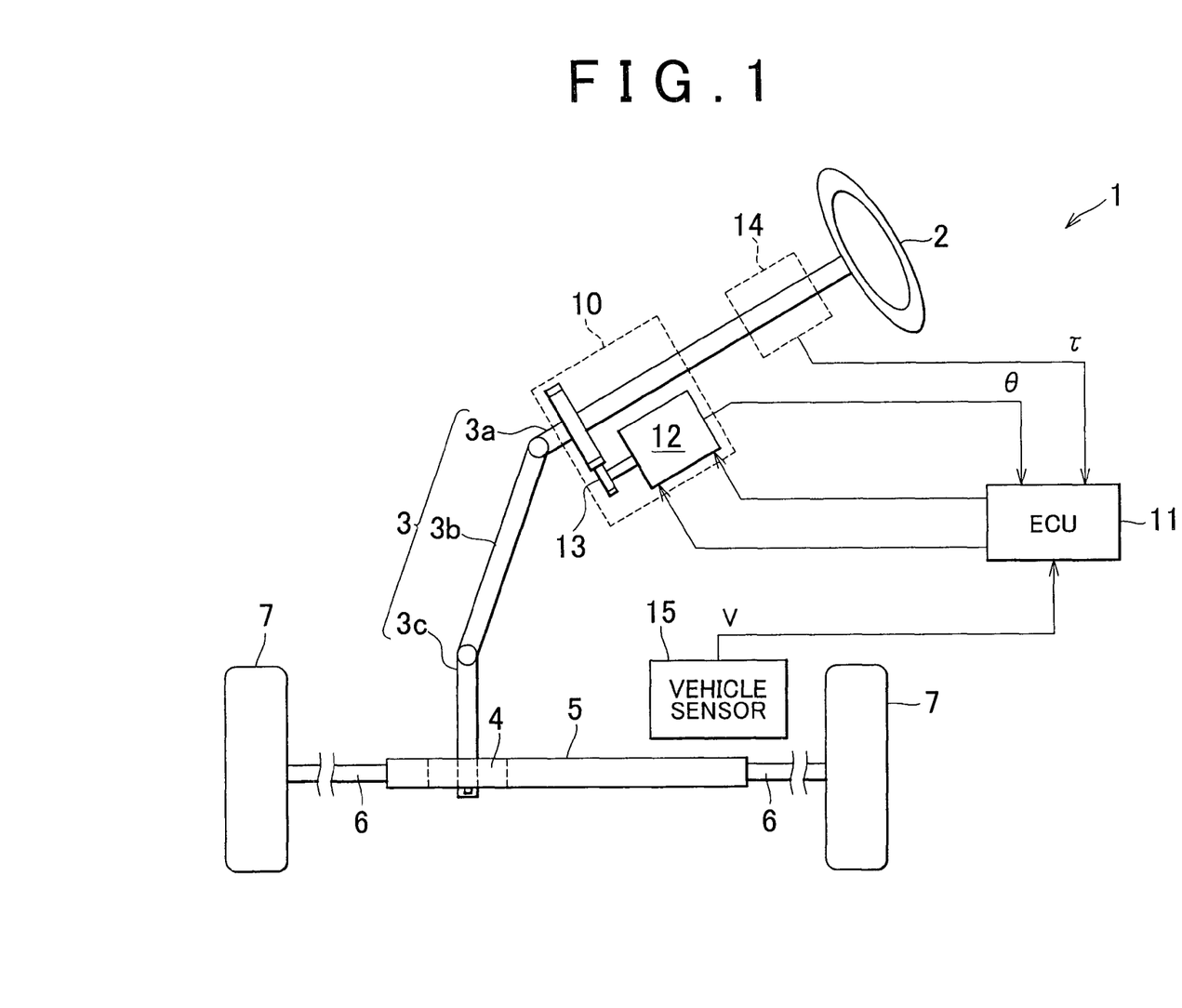
FIG. 1 is a general construction diagram of an electric power steering apparatus (EPS)

Embodiments of the invention will be described hereinafter with reference to the drawings. As shown in FIG. 1, in an electric power steering apparatus (EPS) 1 of an embodiment of the invention, a steering shaft 3 to which a steering wheel 2 is fixed is linked to a rack shaft 5 via a rack-and-pinion mechanism 4. Rotation of the steering shaft 3 involved in the steering operation is converted into linear motion of the rack shaft 5 in either one of two opposite directions by the rack-and-pinion mechanism 4. Incidentally, the steering shaft 3 in this embodiment is made up of a column shaft 3a, an intermediate shaft 3b and a pinion shaft 3c that are linked together. Linear motion of the rack shaft 5 caused by rotation of the steering shaft 3 is transmitted to knuckles (not shown) via tie rods 6 that are connected to two ends of the rack shaft 5, so that the steering angle of steered wheels 7, that is, the travel direction of the vehicle, is changed.

Besides, the EPS 1 includes an EPS actuator 10 as a steering force assist device that gives assist force for assisting in steering operation to a steering system, and an ECU 11 as control means for controlling the actuation of the EPS actuator 10.

In this embodiment, the EPS actuator 10 is constructed as a so-called column-type EPS actuator whose electric motor 12 employed as a drive source is drivingly linked to the column shaft 3a via a speed reduction mechanism 13. The EPS actuator 10 transmits rotation of the electric motor 12 to the column shaft 3a while reducing the speed of the rotation, whereby the motor torque is given as assist force to the steering system.

On another hand, the ECU 1 is connected to a torque sensor 14 and a vehicle speed sensor 15. On the basis of the steering torque τ and the vehicle speed V detected from output signals of these sensors, the ECU 11 computes the assist force (target assist force) that is to be given to the steering system. Then, in order to cause the EPS actuator 10 to generate the target assist force, the ECU 11 controls the actuation of the EPS actuator 10, that is, controls the assist force given to the steering system (power assist control), through supply of the electric power to the electric motor 12 provided as the drive source.

Figure 2:
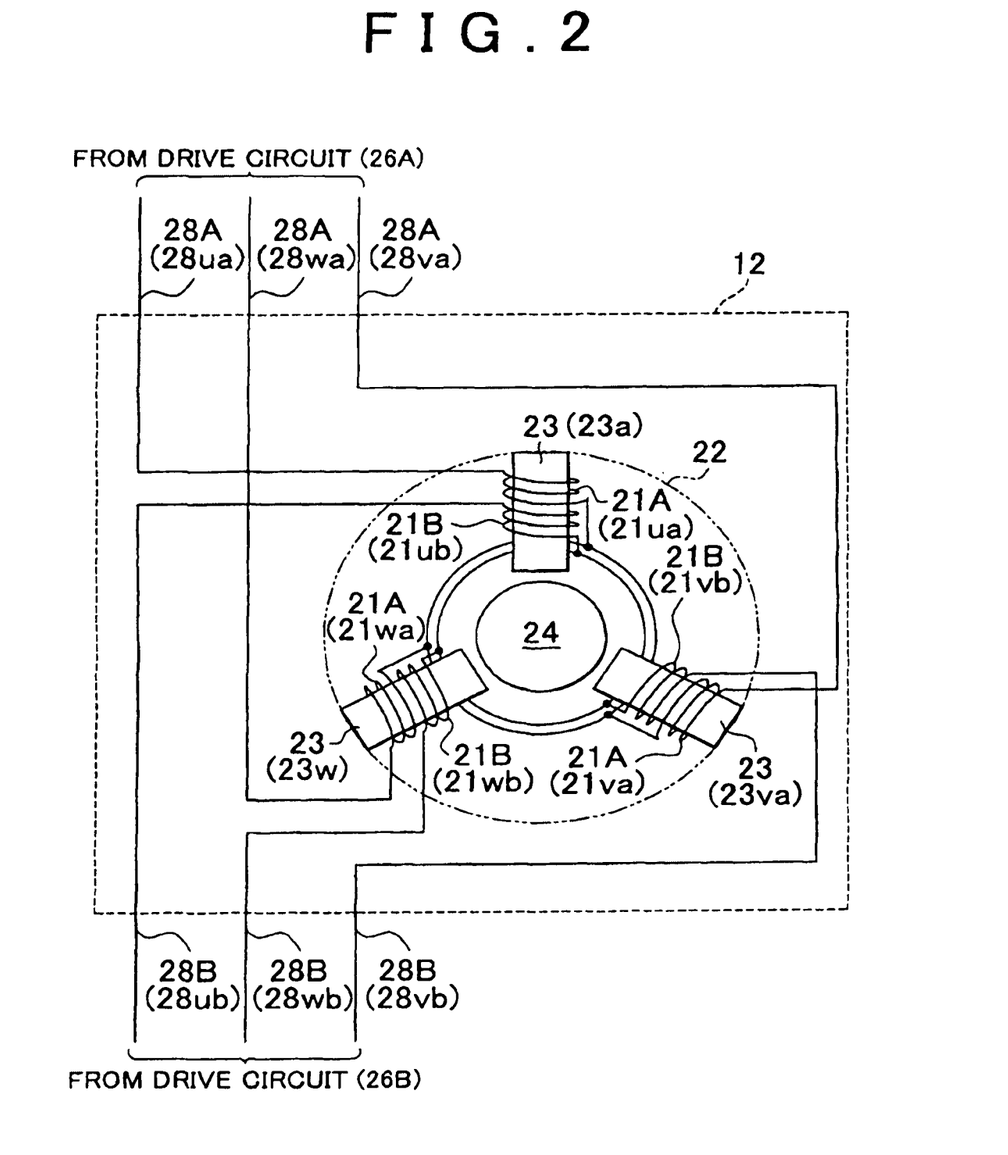
FIG. 2 is a general construction diagram of an electric motor.

Next, an electric construction of the EPS of the embodiment will be described. As shown in FIG. 2, the electric motor 12 in the embodiment is formed by winding motor coils 21A and 21B of two independent systems around a single stator 22. Concretely, the motor coils 21A (21ua, 21va and 21wa) of a first one of the two systems and the motor coils 21B (21ub, 21vb and 21wb) of a second system are each wound separately for a corresponding one of phases (U, V and W) on a corresponding one of teeth 23 (23u, 23v and 23w) of the stator 22. Then, at a radially inward side of the teeth 23 (23u, 23v and 23w), a rotor 24 is rotatably supported.

Specifically, the electric motor 12 in the embodiment has the stator 22 and the rotor 24 that are used commonly for the motor coils 21A and 21B of the two systems. The rotor 24 rotates on the basis of the magnetomotive force generated by the motor coils 21A and 21B that are wound around the teeth 23 (23u, 23v and 23w). Then, the ECU 11 in the embodiment controls the motor torque of the electric motor 12 by supplying drive electric power to the motor coils 21A and 21B independently of each other.

Figure 3:
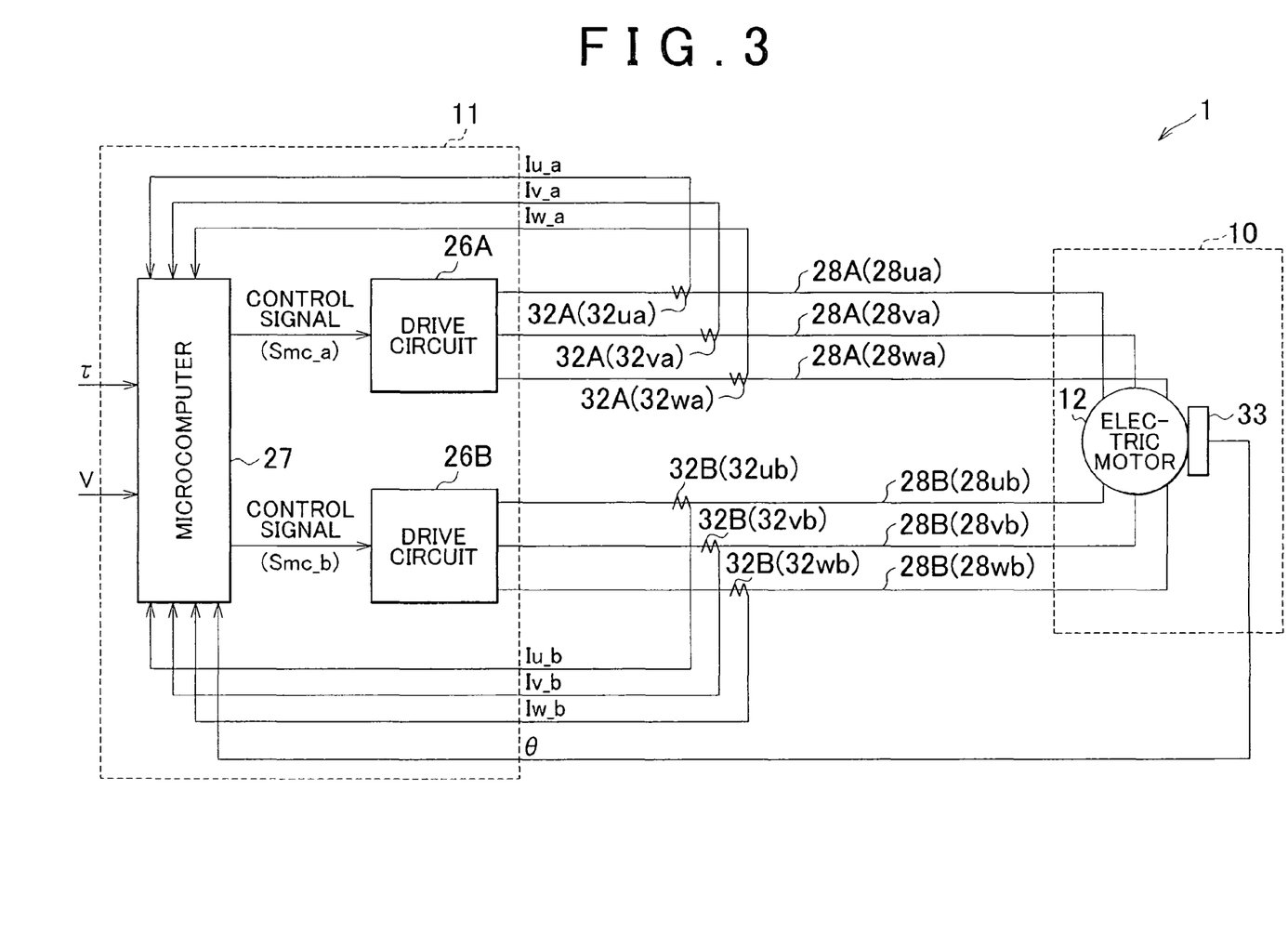
FIG. 3 is a control block diagram of the EPS.

As shown in FIG. 3, the ECU 11 in the embodiment includes two drive circuits 26A and 26B that are provided independently of each other corresponding to the motor coils 21A and 21B, and a microcomputer 27 that outputs control signals Smc_a and Smc_b to the drive circuits 26A and 26B, respectively, independently of each other.

Concretely, the drive circuit 26A is connected to the motor coils 21A of the first system via power lines 28A (28ua, 28va and 28wa), and the drive circuit 26B is connected to the motor coils 21B of the second system via power lines 28B (28ub, 28vb and 28wb). Besides, the control signal Smc_a that the microcomputer 27 outputs is input to the drive circuit 26A, and the control signal Smc_b that the microcomputer 27 outputs is input to the drive circuit 26B. Incidentally, in the embodiment, each of the drive circuits 26A and 26B employs a well-known PWM inverter made up of three basic units (three arms) each of which includes a pair of switching elements connected in series, and which correspond to the three phases and are connected in parallel. The control signals Smc_a and Smc_b that the microcomputer 27 outputs define the on-duty ratios of the three phase arms. The ECU 11 in the embodiment supplies drive electric power that the drive circuits 26A and 26B output on the basis of the control signals Smc_a and Smc_b to the corresponding motor coils 21A and 21B independently of each other.

Figure 4:
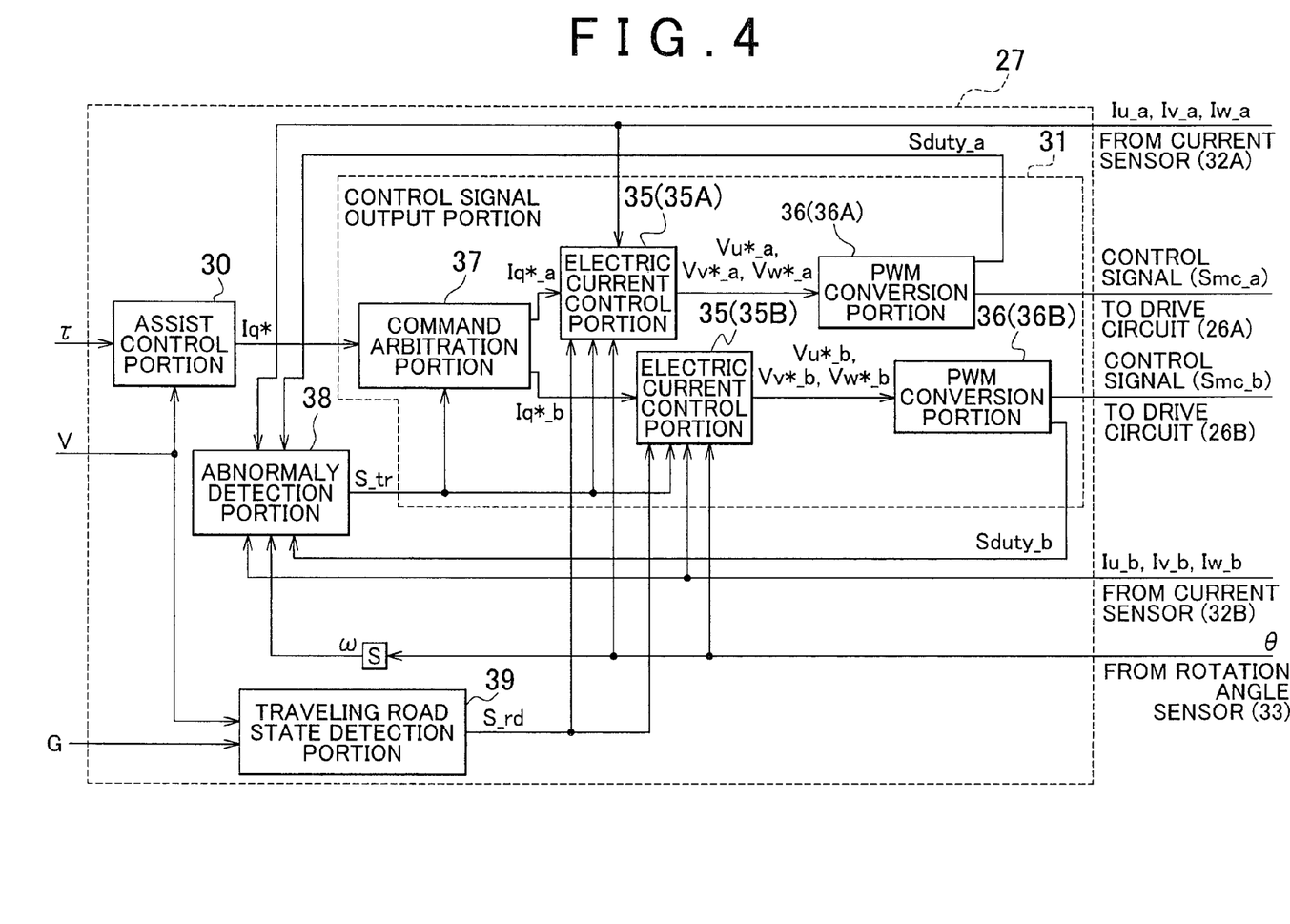
FIG. 4 is also a control block diagram of the EPS.

This will be described in detail. As shown in FIG. 4, the microcomputer 27 in the embodiment includes an assist control portion 30 that generates an electric current command value Iq* regarding the electric power supply to the electric motor 12 in order to generate a motor torque that corresponds to the target assist force, and a control signal output portion 31 that executes the outputting of the control signals Smc_a and Smc_b of the two systems on the basis of the electric current command value Iq*.

In this embodiment, the assist control portion 30 as command means computes the electric current command value Iq* that corresponds to the aforementioned target assist force, on the basis of the steering torque τ detected by the torque sensor 14 and the vehicle speed V detected by the vehicle speed sensor 15. Concretely, the assist control portion 30 computes such an electric current command value Iq* that the greater the steering torque τ is or the lower the vehicle speed V is, the greater assist force is generated. Then, the assist control portion 30 outputs the electric current command value Iq* based on the steering torque τ and the vehicle speed V to the control signal output portion 31 as an electric current command value Iq* regarding the electric power supply to the electric motor 12.

On the other hand, the control signal output portion 31, constituting control signal output means, receives input of phase current values Iu_a, Iv_a and Iw_a and phase current values Iu_b, Iv_b and Iw_b of current passed through the motor coils 21A and 21B (see FIG. 2) of the two systems as well as the rotation angle θ of the electric motor 12. Incidentally, in this embodiment, the phase current values Iu_a, Iv_a and Iw_a and the phase current values Iu_b, Iv_b and Iw_b, as shown in FIG. 3, are detected independently by electric current sensors 32A (32ua, 32va and 32wa) and 32B (32ub, 32vb and 32wb) that are provided on the power lines 28A and 28B, respectively, of the two system, while the rotation angle θ of the electric motor 12 is detected by a rotation angle sensor 33 that is used commonly for the two systems. Then, the control signal output portion 31 outputs control signals Smc_a and Smc_b that correspond to the control signal drive circuits 26A and 26B provided in the embodiment.

This will be described more in detail. The control signal output portion 31 in the embodiment includes an electric current control portion 35A and a PWM conversion portion 36A that correspond to the first system (the system that includes the drive circuit 26A, the motor coils 21A and the power lines 28A shown in FIG. 3), and an electric current control portion 35B and a PWM conversion portion 36B that correspond to the second system (the system that includes the drive circuit 26B, the motor coils 21B and the power lines 28B shown in FIG. 3).

Besides, the control signal output portion 31 includes a command arbitration portion 37 that outputs the electric current command value Iq* input from the assist control portion 30, as a first electric current command value Iq*_a or a second electric current command value Iq*_b. Then, the electric current control portions 35 (35A and 35B) independently execute an electric current feedback control on the basis of the input electric current command values Iq*_a and Iq*_b, respectively.

Concretely, each of the electric current control portions 35 (35A and 35B) converts the phase current values Iu_a, Iv_a and Iw_a or the phase current values Iu_b, Iv_b and Iw_b of a corresponding one of the two systems into d-axis electric current values and q-axis electric current values in a d,q coordinate system that follows the rotation angle θ of the electric motor 12 (d,q conversion). Besides, the electric current command value Iq* is input as a q-axis electric current command value (the d-axis electric current command value is "0"). Then, the electric current control portions 35 (35A and 35B) compute phase voltage command values Vu*_a, Vv*_a and Vw*_a and phase voltage command values Vu*_b, Vv*_b and Vw*_b of the corresponding ones of the two systems by mapping, on a three-phase alternating-current coordinate system, d-axis voltage command values and q-axis command values obtained through execution of the electric current feedback control in the d,q coordinate system (d,q inverse conversion).

Then, each PWM conversion portion 36 (36A, 36B) executes the outputting of the control signal Smc_a or Smc_b for the drive circuit 26A or 26B of a corresponding one of the two systems on the basis of the phase voltage command values Vu*_a, Vv*_a and Vw*_a or the phase voltage command values Vu*_b, Vv*_b and Vw*_b input from a corresponding one of the electric current control portions 35 (35A and 35B).

Besides, as shown in FIG. 4, the microcomputer 27 in this embodiment is provided with a traveling road state detection portion 39 capable of detecting the state of a road on which the vehicle travels. The traveling road state detection portion 39 in this embodiment determines the state of the road on which the vehicle is traveling, on the basis of the vehicle speed V and vertical acceleration G of the vehicle supplied from the vehicle speed sensor 15 and an acceleration sensor (not shown).

Next, a control of the EPS in the embodiment will be described. As shown in FIG. 4, the microcomputer 27 in the embodiment is provided with an abnormality detection portion 38 capable of detecting occurrence of an electrification failure in electric power supply paths of the systems that correspond to the motor coils 21A and 21B (see FIG. 2).

Concretely, the abnormality detection portion 38 in the embodiment receives input of the phase current values Iu_a, Iv_a and Iw_a and the phase current values Iu_b, Iv_b and Iw_b of current passed through the motor coils 21A and 21B of the two systems as well as duty signals Sduty_a and Sduty_b that show on-duty ratios of the phases defined by the control signals Smc_a and Smc_b, and rotation angular speed ω of the electric motor 12. Then, the abnormality detection portion 38 serving as detection means detects occurrence of the electrification failure in each system separately for each phase, on the basis of the aforementioned state quantities.

That is, if, with respect to any one of the phase, the phase current value shows a non-electrified state while the duty signal Sduty_a or Sduty_b shows that the electrified state should be present, the abnormality detection portion 38 is able to determine that the electrification failure has occurred in that phase. Then, the abnormality detection portion 38 in the embodiment also adds a speed condition based on the rotation angular speed ω of the electric motor, and thereby excludes a high-speed rotation state during which influence of reverse electromotive voltage becomes manifest, so that occurrence of the electrification failure can be accurately detected.

Besides, in this embodiment, a result of the abnormality detection by the abnormality detection portion 38 is input to the control signal output portion 31 as an abnormality detection signal. Then, if occurrence of the electrification failure is detected in one of the two systems that correspond to the motor coils 21A and 21B, the control signal output portion 31 in the embodiment gives priority to the output of the control signal to the drive circuit of the other one of the two systems.

This will be described in detail. As shown in a flowchart in FIG. 5, in the control signal output portion 31 in the embodiment, the command arbitration portion 37 firstly determines whether or not the abnormality detection signal S_tr that is input thereto shows detection of the electrification failure (step 501). If the signal shows detection of the electrification failure (YES in step 501), the command arbitration portion 37 subsequently determines whether or not that electrification failure has occurred in the first system corresponding to the motor coils 21A (step 502). Then, if the occurrence of the electrification failure is in the first system (YES in step 502), the command arbitration portion 37 stops the electric power supply in the first system (step 503), and gives priority to the output of the control signal Smc_b to the drive circuit 26B of the second system corresponding to the motor coils 21B (step 504).

Figure 5:
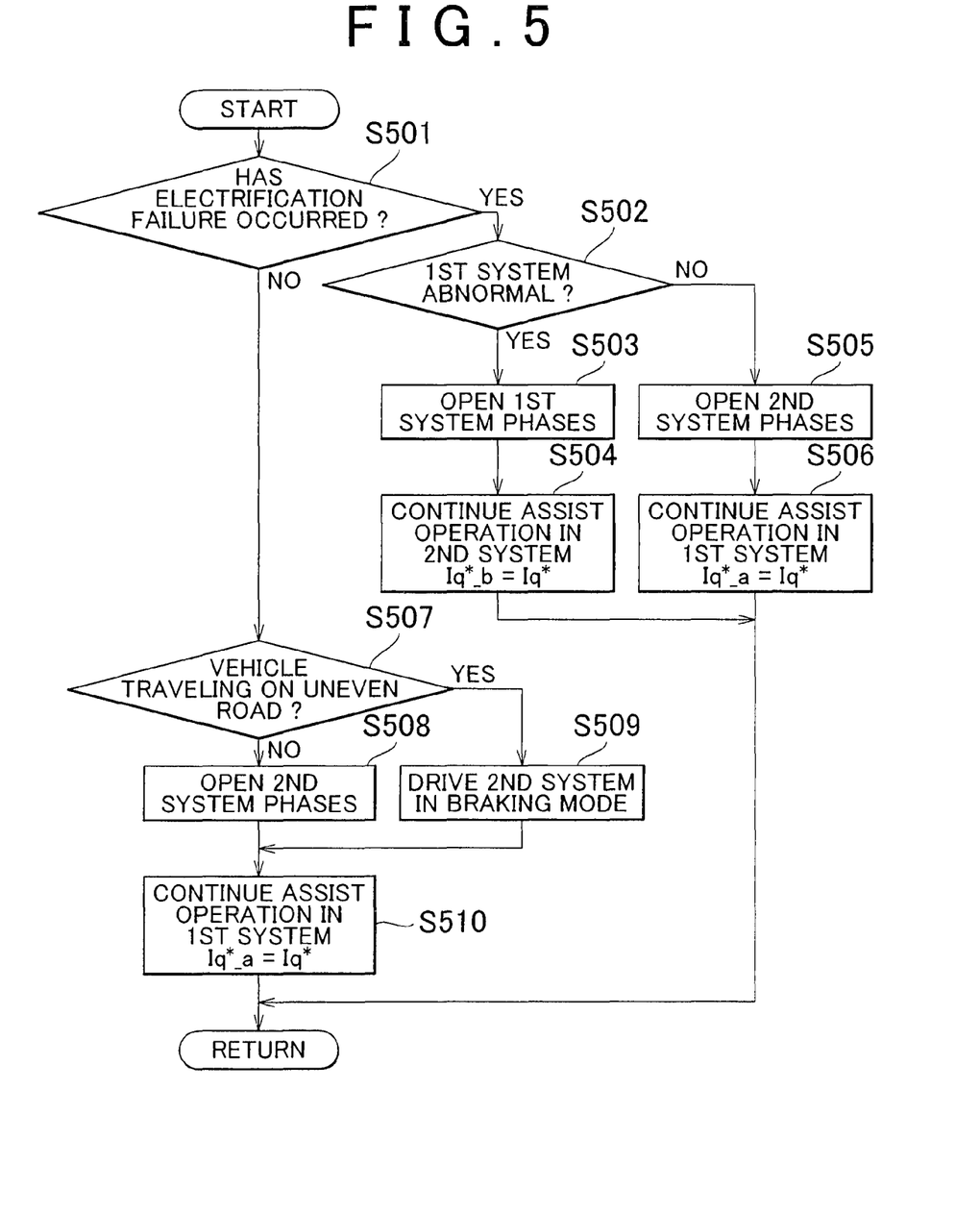
FIG. 5 is a flowchart showing a processing procedure of an assist control.

On the other hand, if in step 502, the command arbitration portion 37 determines that the occurrence of the electrification failure is in the second system (NO in step 502), the command arbitration portion 37 stops the electric power supply in the second system (step 505), and gives priority to the output of the control signal Smc_a to the drive circuit 26A of the first system (step 506). Furthermore, in the embodiment, if in step 501, the command arbitration portion 37 determines that the abnormality detection signal S_tr does not show occurrence of the electrification failure (NO in step 501), the command arbitration portion 37 also gives priority to the output of the control signal Smc_a to the drive circuit 26A of the first system in step 510 (described later).

Each of the electric current control portions 35 (35A and 35B) provided in the control signal output portion 31 in the embodiment computes the phase voltage command values Vu*, Vv* and Vw* of a corresponding one of the two systems so as to supply the three-phase drive electric power as described above during a normal state in which occurrence of the electrification failure is not detected in either one of the systems. The phase voltage command values Vu*, Vv* and Vw* computed by the electric current control portions 35 are input to the PWM conversion portions 36, together with the abnormality detection signal S_tr. Specifically, in the control signal output portion 31 in the embodiment, if the input abnormality detection signal S_tr shows that "occurrence of the electrification failure in a corresponding one of the systems has not been detected", the traveling road state detection portion 39 then determines whether or not the vehicle is traveling on a uneven road. If it is determined that the vehicle is traveling on an ordinary flat road, the electric current control portion 35B, in order to open the motor coils of the three phases of the second system, controls the corresponding PWM conversion portion 36B so that the PWM conversion portion 36B outputs the control signal Smc_b that causes an entire off-state of the upper and lower arm elements (i.e., the upper and lower switching elements) of the three phase arms in the PWM inverter of the drive circuit 26B (ordinary control).

On the other hand, if it is determined that the vehicle is traveling on a uneven road, the electric current control portion 35B controls the PWM conversion portion 36B of the second system so that the PWM conversion portion 36B outputs the control signal Smc_b that causes an entire on-state of the upper or lower arm elements in the PWM inverter of the drive circuit 26B so that at least motor coils of two phases are short-circuited.

This will be described in detail. As shown in the flowchart in FIG. 5, when a travel mode detection signal S_rd generated on the basis of the vehicle speed V and the vehicle's vertical acceleration G input from the vehicle speed sensor 15 and the acceleration sensor (not shown) shows that the vehicle is traveling on an ordinary flat road surface (NO in step 507), the control signal output portion 31 in this embodiment opens the motor coils of the three phases of the second system (step 508). Subsequently, the PWM conversion portion 36A outputs the control signal Smc_a to the drive circuit 26A of the first system (step 510) in order to continue the execution of the assist control by the first system. If the traveling road state detection portion 39 shows detection of the traveling of the vehicle on a uneven road (YES in step 507), the electric current control portion 35B drives the second system in a braking mode (e.g., a dynamic braking in which a braking electric current is passed through the upper or lower arm elements of the inverter) (step 509). Subsequently the electric current control portion 35A of the first system outputs the control signal Smc_a to the drive circuit 26A of the first system in order to continue the execution of the assist control (step 510).

According to the embodiment, operation and effects as follows can be obtained. The electric motor in this embodiment has the stator and the rotor that are common to the motor coils of the two systems, and the rotor rotates on the basis of the magnetomotive force that is generated by the motor coils that are wound around the teeth as described above. The ECU (control means) in this embodiment is constructed to control the motor torque by supplying the drive electric power to the individual motor coils independently of each other. That is, the ECU in this embodiment includes the two drive circuits that are provided independently of each other corresponding to the motor coils, and the microcomputer that outputs the control signals to the drive circuits independently of each other.

According to the foregoing construction, when the vehicle is traveling on an ordinary flat road, one of the two systems executes the known torque control of controlling the assist torque according to the steering torque and the vehicle speed, and the other system usually leaves the motor coils open, and therefore does not operate the electric motor. When it is determined that the vehicle is traveling on a uneven road, short-circuit is made between at least two phases of the motor coils of the other system so as to bring about a braking operation (dynamic braking). As a result, the external disturbance energy that is input due to the traveling on the uneven road can be consumed as heat generation by the internal resistance of the electric motor, so that wobble of the steering wheel (loss of control of the steering wheel) and vibration thereof are restrained. Therefore, the straight-ahead directional stability can be maintained and the steering feeling can be improved.

Besides, due to the motor construction in which the stator and the rotor are provided for shared use by the two systems, the cost of the electric motor can be reduced. In the case where the electrification failure occurs in the inverter of the system that is executing the assist control, the other system, which is normal, is used to execute the known torque control so as to continue the steering assist operation. As a result, by stopping the electric power supply to the system in which the electrification failure has occurred, and switching to the assist control performed by the other system that is normal, it is possible to continue the steering without occurrence of a torque ripple.

Incidentally, the foregoing embodiment may be changed or modified as follows.

(a) Although in the foregoing embodiment, the invention is embodied as the column assist type EPS 1, the invention may also be applied to a pinion assist type EPS and a rack assist type EPS.

(b) In the foregoing embodiment, the EPS actuator 10 uses as a drive source the electric motor 12 that has the stator 22 the rotor 24 that are common to the motor coils 21A and 21B of the two systems. However, this is not restrictive. For example, the invention may be embodied as a construction in which each motor coil has its own stator or its own rotor. Furthermore, the invention is also applicable to a construction that employs two electric motors as drive sources.

(c) Besides, the motor coils of each system may be disposed so as to have a relationship in which the phases of the coils are shifted from each other.

(d) Although in the foregoing embodiment, while the vehicle is traveling on a uneven road, at least two phases of the motor coils of the second system are short-circuited so that the electric motor is driven in the braking mode, short-circuit and open-circuit of the motor coils of the second system may be repeated intermittently so that the motor coils are controlled alternately in the braking state and a free state. Besides, the control of the motor coils of the second system may be a PWM control in which the state of the motor coils is changed from an intermittently-on state to a short-circuit state according to the rotation speed of the electric motor, or may also be a control in which the state of the motor coils is changed from an intermittently-on state to a short-circuit state according to the cycle of the fluctuation of the motor rotation.

(e) Although in the foregoing embodiment, the motor coils of the second system are opened while the vehicle is traveling on an ordinary road surface, the second system may be controlled so that the motor torque output of the second system becomes zero during such a traveling state.

The invention claimed is:

1. An electric power steering apparatus for use with a vehicle on a road, the electric power steering apparatus comprising:
    an electric motor having two systems independent from each other, each system having motor coils wound on each of a plurality of stator teeth;
    a steering force assist device configured to provide an assist force based on magnetomotive force generated by the motor coils of the two systems; and a controller configured to: (i) control an assist operation of the steering force assist device through controlling electric power supply to the motor coils, and (ii) determine that a predetermined condition is satisfied when the controller detects that the vehicle is traveling on an uneven road, the controller including:
(1) a command unit configured to generate an electric current command value for the electric power supply so as to generate a motor torque that corresponds to the assist force,
(2) a control signal output unit configured to output control signals for the two systems independent of each other, based on the electric current command value, and
(3) a plurality of drive circuits for the two systems independent of each other that output three-phase drive electric power to the motor coils that respectively correspond to the drive circuits based on the control signals, wherein, when the predetermined condition is satisfied, the control signal output unit outputs: the control signals to the drive circuits such that at least two phases of three phases of the motor coils of one of the two systems that is not executing the assist operation are short-circuited, and the control signals for continued execution of an assist control to the motor coils of one of the two systems executing the assist operation.

2. The electric power steering apparatus according to claim 1, wherein the predetermined condition is satisfied when reverse input of force from a steered wheel to the steering force assist device is greater than or equal to a predetermined value.

3. The electric power steering apparatus according to claim 1, wherein the predetermined condition is satisfied depending on a road surface state that is determined based on speed of a vehicle in which the electric power steering apparatus is mounted and vertical acceleration of the vehicle.

4. The electric power steering apparatus according to claim 1, wherein the motor coils of the two systems has a stator and a rotor which are used in common between the two systems.

5. The electric power steering apparatus according to claim 1, wherein the control signals to the drive circuits and the control signals for continued execution of an assist control are capable of being output at the same time.

* * * * *